United States Patent
Maiya et al.

[11] Patent Number: 6,117,808
[45] Date of Patent: Sep. 12, 2000

[54] DENSE CERAMIC MEMBRANE MATERIAL FOR CONVERSION OF METHANE TO SYNGAS

[75] Inventors: P. Subraya Maiya, Darien; John J. Picciolo, Lockport; Joseph T. Dusek, Lombard, all of Ill.

[73] Assignee: The University of Chicago, Chicago, Ill.

[21] Appl. No.: 09/010,424

[22] Filed: Jan. 21, 1998

[51] Int. Cl.[7] .............................. B01J 20/28; C04B 35/01
[52] U.S. Cl. .............................. 502/4; 502/406; 501/123; 501/126; 48/198.7
[58] Field of Search .............................. 502/4, 406, 525; 501/123, 126; 423/594; 48/198.7

[56] References Cited

U.S. PATENT DOCUMENTS

| | | | |
|---|---|---|---|
| 5,356,728 | 10/1994 | Balachandran et al. | 429/8 |
| 5,478,444 | 12/1995 | Liu et al. | 252/519 |
| 5,580,497 | 12/1996 | Balachandran et al. | 252/519 |
| 5,624,542 | 4/1997 | Shen et al. | 429/30 |
| 5,725,218 | 3/1998 | Maiya et al. | 277/1 |
| 5,935,533 | 8/1999 | Kleefisch et al. | 422/211 |

*Primary Examiner*—Ngoc-Yen Nguyen
*Attorney, Agent, or Firm*—Cherskov & Flaynik

[57] ABSTRACT

An improved highly oxygen permeable substrate is provided comprising Sr—Fe—Co-oxide and a metal combined with said material. Also provided is a method for producing an improved membrane to facilitate oxidation of compounds comprising combining metal or metal alloys with Sr—Fe—Co-oxide to create a mixture, and sintering the mixture so as to allow the metal to melt within the mixture. The membrane is also utilized in a method for converting methane to syngas whereby a fluid containing oxygen is contacted to a first surface of the membrane for a sufficient period of time so as to cause some of the oxygen to be transported to a second surface of the membrane; and contacting methane to the second surface for a sufficient period of time to cause oxidation of the methane.

11 Claims, 2 Drawing Sheets

EXPOSED TO Ar + $H_2$ AT 1180°C FOR 48 H

EXPOSED TO Ar + $H_2$ AT 1180°C FOR 48 H

DENSE CERAMIC MEMBRANE MATERIAL FOR CONVERSION OF METHANE TO SYNGAS

CONTRACTUAL ORIGIN OF THE INVENTION

The United States Government has rights in this invention pursuant to Contract Number W-31-109-ENG-38 between the United States Government and Argonne National Laboratory.

BACKGROUND OF THE INVENTION

1. Field of the Invention

This invention relates to a membrane and a method used for producing syngas and, more particularly, to an improved ceramic membrane and method for converting methane to syngas.

2. Background of the Invention

Conversion of natural gas (mostly methane) to more valuable liquid products such as transportation fuels and chemicals is driven by the abundance of the feedstock, particularly in remote areas. For example, many remote natural gas fields throughout the world remain capped because there is no way to economically market the natural gas contained there. As such only 3 to 4 percent of natural gas feedstocks are utilized. The conventional route is to transport the natural gas by either pipeline or as liquefied natural gas. But pipelines are economical only when the gas field is close to the consumer. Liquefied natural gas can be considered only on a commercial scale.

The other alternative to exploiting natural gas reserves is to convert natural gas by oxidation through direct or indirect means. Direct conversion results in a partial oxidation of natural gas to methanol, formaldehyde or other organic compounds. However, this direct method produces products that are more reactive than the starting material.

Indirect approaches of methane conversion include the production of syngas (CO+H$_2$). This conversion is depicted in Equation 1, below:

$$CH_4 + \frac{1}{2}O_2 \rightarrow \underset{\text{(Syngas)}}{CO + 2H_2} \qquad \text{Equation 1}$$

Typical oxidation methods involve the conversion of methane to syngas by steam. The syngas is then used as a feedstock to produce more complex molecules via Fischer-Tropsch technology or methanol synthesis. These efforts typically are endothermic and also yield low conversion rates and selectivities.

Direct partial oxidation of methane with air as the oxygen source also has been attempted. However, inasmuch as downstream processing requirements cannot tolerate nitrogen, the need for oxygen separation technology arises, with its concomitant costs.

Efforts have been made using oxygen-transport materials to supply oxygen to organic streams to facilitate oxidation reactions. For example, U.S. Pat. No. 5,356,728 to Balachandran et al., discloses a reactor comprising a new material (whereby the new material has a chemical formula SrFeCo$_{0.5}$O$_x$ with x approximately equal to 3) and which is used to facilitate oxygen transport by exploiting the electron-and oxygen-transfer characteristics of the structure.

U.S. Pat. Nos. 5,639,437 and 5,580,497, also to Balachandran et al., describe an oxygen ion-conducting dense ceramic membrane (having the same chemical formula as stated in the previous paragraph) and methods for preparing ceramic membranes to facilitate oxidation reactions in a feed gas containing organic compounds.

However, the typical oxygen-transport materials such as those based on current Sr—Fe—Co systems lack certain mechanical properties required for long-term performance. Generally, these materials lack the superior mechanical properties such as strength and fracture toughness and micro-structural stability required in commercial applications, particularly those applications dealing with a highly reducing environment on one side of a membrane and an oxidizing environment on the other side of the membrane.

A need exists in the art for a membrane material which can facilitate oxygen transport to a compound stream while exhibiting durability in commercial and industrial scenarios. The membrane should withstand multiple thermal cyclings without a decrease in oxygen transport characteristics. The manufacture of the membrane should be relatively economical and use materials widely available.

SUMMARY OF THE INVENTION

It is an object of the present invention to provide a material to facilitate oxidation of fluid that overcomes many of the disadvantages of the prior art.

Another object of the present invention is to provide a modified ceramic material for use in oxidation reactions with target compounds. A feature of the material is the incorporation of metal. An advantage of the modified material is its enhanced density, flexural strength and fracture toughness. Another advantage of the material is that its oxygen-transport characteristics are not adversely affected by the high density and improved mechanical property characteristics conferred by the addition of the metal. In fact, in many cases, the addition of metal improves the oxygen transport properties.

Still another object of the present invention is to provide an improved ceramic membrane for use in converting methane to syngas. A feature of the membrane is the combination of silver and Sr—Fe—Co oxide (SFC-2) in predetermined weight percents to arrive at a precursor powder for subsequent fabrication into the membrane. An advantage of the membrane is enhanced micro-structural stability with improved mechanical properties.

Yet another object of the present invention is to provide a method for efficiently converting methane to syngas in industrial applications. A feature of the present invention is the use of a durable ceramic material with enhanced oxygen permeability. An advantage of the invented method is the higher methane conversion rates using air as an oxygen feedstream and the lower costs associated therewith inasmuch as no oxygen plant is necessary for downstream processing.

Briefly, the invention provides for a substrate through which oxygen is transported, comprising a Sr—Fe—Co-oxide and a metal combined with said oxide. wherein the oxide has general chemical formula SrFeCo$_{0.5}$O$_x$ with x less, equal to, or greater than 3.

Also provided is a method for producing a membrane to facilitate oxidation of compounds comprising preconditioning a Sr—Fe—Co oxide material; combining metal with the oxide material to create a mixture; and sintering the mixture so as to allow the metal to melt within the mixture.

The invention also provides a method for converting methane to syngas comprising supplying a substrate comprised of a metal-containing Sr—Fe—Co-oxide, whereby the substrate has a first surface and a second surface; contacting a fluid containing oxygen (such as air or an oxygen-containing environment) to the first surface for a sufficient period of time so as to cause some of the oxygen to be transported to the second surface; and contacting methane with the second surface for a sufficient period of time to cause oxidation of the methane to syngas.

BRIEF DESCRIPTION OF THE DRAWING

The present invention together with the above and other objects and advantages may best be understood from the following detailed description of the embodiment of the invention illustrated in the drawing, wherein.

DETAILED DESCRIPTION OF THE PREFERRED EMBODIMENT

Generally, the invention provides for an oxygen exchange membrane that withstands harsh conditions associated with oxidation and reduction procedures performed in commercial and industrial settings. Specifically, the invention facilitates the conversion of methane to syngas via a simple oxygen exchange procedure utilizing a mixed oxide material based on a Sr—Fe—Co-oxide system. More specifically, the inventors have found, surprisingly and unexpectedly, that an improved ceramic material having the general formula $SrFeCo_{0.5}O_x$, (SFC-2) wherein x is approximately 3, and which also contains a metal such as silver, displays superior properties without adversely affecting oxygen transport characteristics of the ceramic lattice.

Membranes constructed from this material, when used in a natural gas conversion reactor, transport oxygen and will also transport electrons back toward the catalytic side of the reactor to the oxygen-reduction interface. No external electrodes are required and if the driving potential of the transport is sufficient, the partial oxidation reactions are spontaneous inasmuch as an externally applied potential is not necessary.

A salient feature of the invention is the incorporation of metals and/or metal oxides in relatively small quantities during the fabrication of the membranes. Metals including, but not limited to, Ag, Co, Cr, Pt, and Au are suitable candidates. A myriad of alloys are also suitable dopants, including but not limited to zirconium-nickel combinations, copper-nickel combinations, copper-zirconium combinations, copper-silver combinations, nickel-titanium combinations, aluminum-iron combinations, nickel-boron combinations, copper-titanium combinations, silver-chromium combinations, silver-palladium combinations, and combinations of the above combinations.

As explained infra, experiments with Ag have resulted in greater density and therefore added strength to oxidation membranes. This added toughness is required in industrial applications. Surprisingly and unexpectedly, the inventors found that oxygen permeability was not adversely affected with the addition of the Ag, despite the increase in density of the membrane. In many cases oxygen permeation increased when silver was utilized, compared when the membrane material alone (i.e., without Ag-dopant) was used.

The addition of from about 1 to 9 weight percent of fine particles of metallic silver to SFC-2 powder during membrane preparation resulted in a ceramic material having increased percent of theoretical density, increased fracture toughness, and increased flexural strength. A preferable mixture of approximately 2 to 4 weight percent of silver to the powder conferred superior resistance to fracture of the resulting membrane material.

Figure 1A:
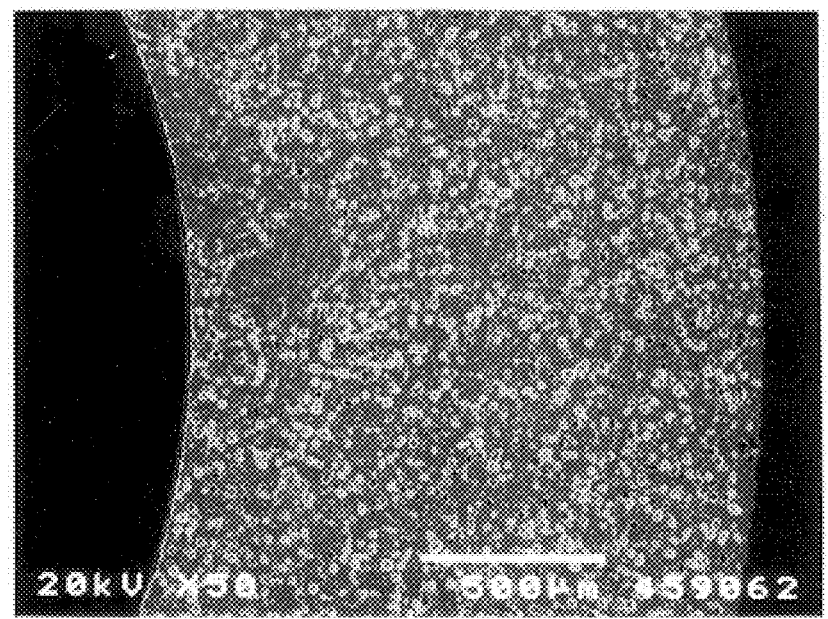
FIG. 1A is a photomicrograph of typical membrane material, after exposure to a reducing environment, in accordance with features of the invention.
Figure 1B:
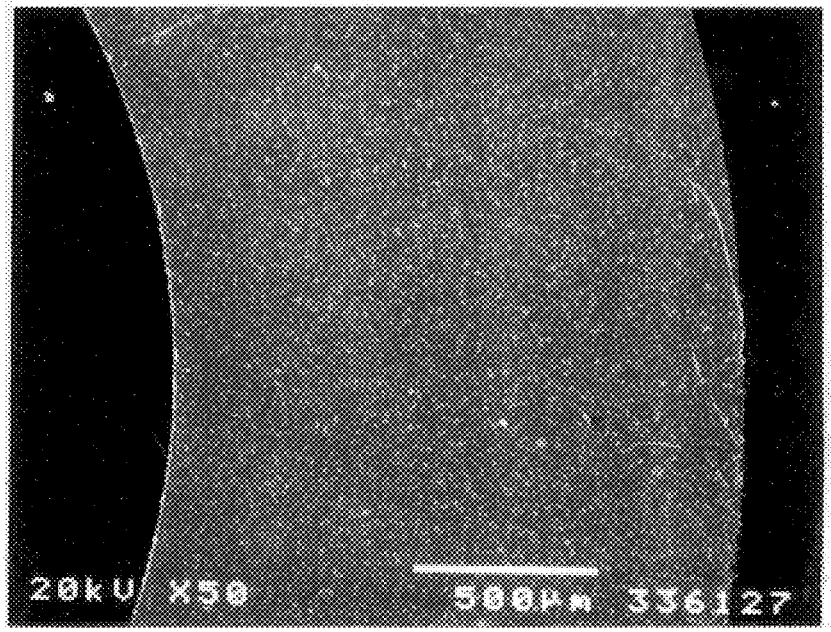
FIG. 1B is a photomicrograph of a Ag-containing membrane material, after exposure to a reducing environment, in accordance with features of the invention.

In tests on the material in strongly reducing environments, porosity of the material was greatly lowered with no evidence of reduction of CoO to CO. Thus, significant microstructural stability was achieved by the addition of Ag. FIGS. 1A and 1B depict the enhancement of microstructural stability when silver is added. As can be determined from FIG. 1 A, membranes not fabricated with silver dopant displayed highly porous structures after exposure to reducing environments. In this instance, the membrane was exposed to an argon and hydrogen gas stream mixed with water vapor at 1180° C. for 48 hours.

Under the same conditions, a membrane fabricated with 2 weight percent silver showed relatively little porosity, as depicted in FIG. 1B.

Figure 2:
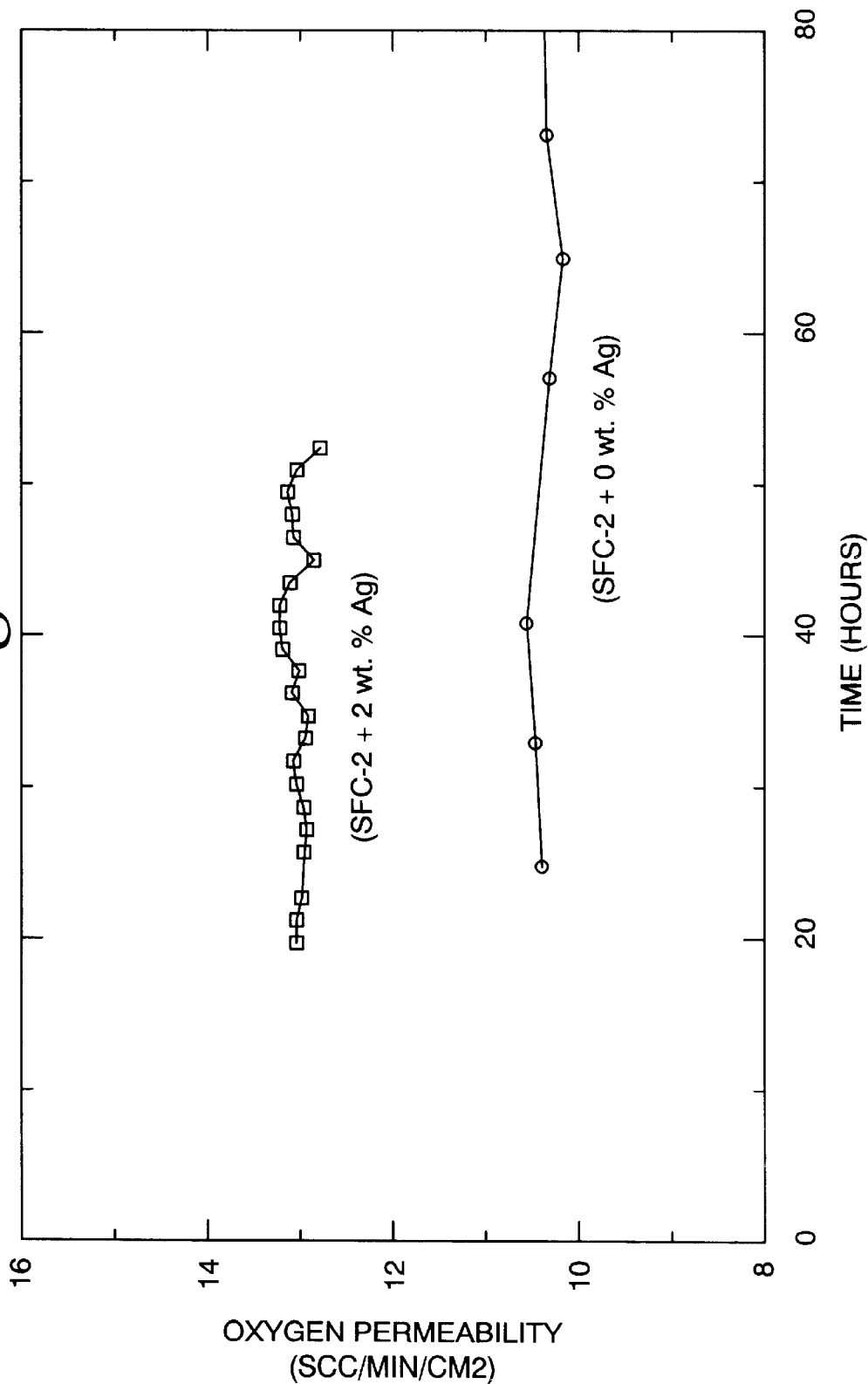
FIG. 2 is a graph comparing oxygen permeation rates through various membranes, in accordance with features of the invention.

A graph comparing the enhanced oxygen-transport characteristics of the modified ceramic material versus undoped (i.e. SFC-2) material is depicted in FIG. 2. As depicted in FIG. 2, the "flux" or oxygen permeability of SFC-2 material doped with silver is 13 standard cubic centimeters per minute per square centimeter ($scc/min/cm^2$) versus 10 scc/$min/cm^2$ for undoped material.

A salient feature of the method for making the improved oxygen-ion transport membranes is the incorporation of metal (such as silver) or alloy which when sintered, melts in the SFC-2 powder, but does not lead to the alteration of the ceramic lattice. As such, ion transport is unhindered between the reduction and oxidation surfaces of the membrane. It has been observed that the melting of the metal or alloy materials during the sintering at temperatures above 1,100° C. facilitates densification of the ceramic-oxide membrane, with the resultant improvement in mechanical properties, as shown in Table I. Generally, the inventors have observed that this sintering scenario facilitates dispersion of the dopant within the grains of the polycrystalline material, which leads to the increased density. Any dopant which melts at beginning sintering temperatures (of approximately 1,100° C.) is suitable.

Membrane Fabrication Detail $SrFeCo_{0.5}O_x$ powder was uniformly mixed with a quantity of metal such as silver. Particle sizes of the powders range from −325 mesh (U.S. Standard) or finer. Suitable metal particles range from approximately 0.5 to 6 microns ($\mu$m) and more preferably from 1 to 3 $\mu$m. The SFC-2 powder is commercially available from Praxair Speciality Ceramics Inc. (formerly SSC Inc.), of Woodinville, Wash. The following protocols are used to fabricate either planar substrates or reactor tubes/conduits from the powder-metal combination:

To produce planar substrates, the powder and metal (e.g. silver) is first dry mixed and sieved to facilitate homogeneity of the powder mixture. The use of −100 mesh is one exemplary approach for achieving homogeneity. Isopropyl alcohol (IPA) is then added to the powder to create a slurry. While any weight ratio of IPA to powder sufficient to create a slurry is suitable, the inventors found that an IPA to powder weight ratio of 1 to 1.2 is convenient. The slurry is then heated while stirring so as to allow the alcohol to evaporate, thereby recreating a dry phase.

The resulting powder is then re-sieved to between −200 and −325 mesh (U.S. Standard). The resulting powder is then pressed into rectangular bar specimens for subsequent exposure to sintering treatments in air and nitrogen. For greater strength, the application of the pressure can occur in a plurality of increments and at pressures ranging from 100 to 200 MPa and preferably at a pressure of approximately 130 MPa.

Tubes comprising the material were extruded via the following protocol: The SFC-2 and metal (e.g. silver) are mixed at the weight ratios designated herein to form a powder. The resulting powder are then dispersed in a liquid medium to form a slip. One suitable medium is a mixture of xylene and butanol by volume. To the resulting slip is added a deflocculent or dispersant, one such deflocculent being the dispersant Manhaden fish oil from Spencer-Kellogg of Buffalo, N.Y. To the dispersant-treated slurry is added a plasticizer and a binder. Suitable plasticizers include phthalate compounds, and more specifically butyl benzyl phthalate. One such phthalate compound commercially available as Santicizer 160 from Monsanto of St. Louis, Mo. is suitable.

Any ester of acrylic and methyl acrylic acids are suitable acrylic resins, and more preferably solvent-type thermosetting acryloid resins. As such, one suitable acrylic binder commercially available through Rohm&Haas (Philadelphia, Pa.) as Acryloid AT-51® provides good results.

One typical slip has the following solution and powder proportion ranges:

| Constituent | Powder Proportion Weight Percents |
|---|---|
| Powder (SFC-2) | |
| Silver (4 percent by weight) | 1–9 |
| Solvent (78/22 xylene/butanol) | 8–30 |
| Deflocculent (Manhaden Fish-Oil) (80% Oil, 20% 78/22 solvent) | 1–8 |
| Plasticizer (S-160) | 1–8 |
| Binder (AT-51) (50% binder, 50% 78/22 solvent) | 2–14 |

An exemplary slip comprises 192 grams of powder (SFC-2), 8 grams of silver, 50 grams of 78/22 xylene/butanol solution, 10 grams of dispersant, 10 grams of plasticizer and 21 grams of binder.

The resulting slip is milled to disperse and homogenize the ingredients. Then, the paint-like slurry is then taped cast to remove excess solvent, and subsequently processed in a high shear mixer to produce a dough-like or plastic, extrudable mass which can withstand extrusion into desired shapes, in this instance, reactor conduits or tubes. Any typical extruder is suitable, including the double-tilt ram extruders manufactured as Loomis 232 DT® by Loomis Products Company, of Levittown, Pa.

After extrusion, the formed material "cures", such as by allowing it to air dry, for a period of time prior to sintering, such time ranging from 24 to 72 hours.

Sintering temperatures used for the production of either flat substrates or tubes range from between 1,100 to 1,300° C. and for approximately 4–72 hours. Surprisingly and unexpectedly, the inventors have found that a two step sintering procedure produces superior results. For example, if sintering occurs first at approximately 1,180° C. in air for four hours and then at 1,100° C. in nitrogen for 48 hours, the resulting product displays superior mechanical properties. Binder bum-out (i.e., the a volatilization of excess binder material used to form the initial slurry) occurs at the beginning of the sintering process.

The fired density was determined by conventional methods. Theoretical density was estimated by helium pycnometry. As shown in Table 1, addition of Ag improves the percentage of theoretical density with values as high as 95 percent being achieved. This high value is the result of the silver melting during sintering and thereby facilitating densification.

Elastic properties were measured by ultrasonic methods. Both Young's and elastic moduli were found to increase with silver. Beyond two weight percent of silver, however, no increase in elastic properties occurs.

Flexural strength was determined in a four-point bending mode. It was found that flexural strength increased with the addition of silver, with optimal strength achieved when silver was present in weight percents of between 2 and 4.

Fracture toughness was a function of silver content was determined by both single-edge notch and Vickers hardness indentation methods. The inventors observed an increase in fracture toughness with addition of silver.

As noted supra during discussion of FIGS. 1A and 1B, the effects of strongly reducing environments on the thermodynamic stability of the invented materials were investigated. The reducing environments simulate those encountered on the methane side of the reactor tubes. In reducing environments at elevated temperatures, significant porosity was observed in the non-doped (SFC-2 only) material, with some of the CoO being reduced to Co-metal. The porosity weakens the membrane material. Furthermore, the inventors surmise that the reduction of CoO to Co-metal is likely to adversely affect oxygen transport properties.

TABLE 1

Effects of Ag Addition on Physical and Mechanical Properties of SFC-2 Material

| | NP + 0 wt % | NP + 1 wt % | NP + 2 wt % | NP + 4 wt % | NP + 8 wt % |
|---|---|---|---|---|---|
| % of Theroretical Density | 88 | 89 | 94 | 96 | 96 |
| Flexural Strength Mpa | 81 ± 16 | 96 ± 31 | 142 ± 21 | 136 ± 36 | 140 ± 2 |
| Fracture Toughness MPa/m | 1.70 ± 0.13 | 2.33 ± .07 | 2.60 ± 0.37 | 2.51 ± 0.29 | 2.50 ± 0.17 |
| Young's Modulus GPa | 100 | 400 | 146 | 143 | 140 |
| Shear Modulus GPa | 39 | 53 | 56 | 55 | 53 |
| Poisson Ratio | 0.30 | 0.31 | 0.31 | 0.31 | 0.31 |

Porosity is significantly reduced when two weight percent of Ag is added. Furthermore, no evidence of reduction of CoO to Co occurs. As such, the addition of Ag results in the enhancement of microstructural stability.

In operation, the fabricated membranes facilitated superior conversion rates of methane to syngas in the presence of oxygen. At temperatures ranging from between 800° C. and 1000° C., conversion rates of greater than 90 percent was achieved. More particularly, conversion rates of more than 95 percent were obtained at temperatures ranging from between 850° C. and 900° C.

The use of the oxygen-transport membrane exploits an oxygen gradient which exists between a first surface of the membrane and a second surface of the membrane when the first surface of the membrane is contacted with an oxygen-laden fluid such as air and when the second surface of the membrane is in contact with an oxygen-deficient fluid such as methane. If the oxygen-containing fluid is air and the oxygen-deficient fluid is methane, a steep oxygen pressure gradient exists to transport oxygen through the membrane. Specifically, the partial pressure of oxygen on the "air side" is approximately 0.2 atmospheres (atm). The partial pressure of oxygen on the methane side is approximately $10^{-20}$ to $10^{-22}$ atm. As such, and at elevated temperature, oxygen anions will permeate from the first surface to the second surface to maintain the steady (ionic) state of the transport process.

The membrane is permeable to oxygen at high temperatures, but not to nitrogen or any other gas. Generally, membranes ranging in thicknesses of between approximately 0.5 millimeters to 0.8 millimeters provides good oxygen-ion exchange. However, in industrial applications, thickness determinants depend on the inverse relationship of membrane thickness to oxygen permeability characteristics.

In the presence of oxygen (reformed from the permeated oxygen ions) and a catalyst, the methane converts to syngas (depicted in equation 1 above) at the very efficient rates, noted supra.

Reforming catalysts placed within the methane stream (i.e., placed in the reaction zone) facilitate conversion to syngas. Rhodium-based catalysts such as rhodium oxides impregnated on zirconia or magnesium-oxide/alumina supports facilitate the oxidation reaction. An exemplary catalyst is the 2% Rh-4%Co-MgO·Al$_2$O$_3$ disclosed in U.S. Pat. No. 5,439,861 to Bhattacharyya et al.

Methane flow rates across the membrane surfaces can vary, depending on available surface area of the membrane. Generally, flow rates and/or surface areas which result in a molar ratio of 1:2 oxygen to methane (as depicted in Equation 1) will facilitate conversion. Flow rates of 100 cc/minute are suitable in a laboratory-scaled setting. If no internal standard is required, then methane can be fed to the membrane reactor neat (i.e., without argon or some other suitable inert fluid as a diluent). Initial flow rates generally will be one-tenth the flow rate utilized when the process has reached equilibrium.

The invented membrane can be utilized in an exemplary laboratory-scale methane conversion unit, described in P.S. Maiya et al. *Solid State Ionics*, 99 (1997) pp 1–7, incorporated herein by reference. In that conversion unit, an SFC-2 tube was utilized having an outside diameter of 7 mm and wall thickness of 0.75 mm. To facilitate oxidation and efficient anion transport through the membrane, both surfaces of the membrane are maintained at in an isothermal environment (i.e., a hot zone), including but not limited to temperatures of between approximately 850° C. and 900° C.

To facilitate reactions and equilibration of gases in the reactor, 2.5 grams of catalyst are loaded downstream to the tube. Analysis is done using a typical gas chromatograph, such as a Hewlett-Packard 5890 gas chromatograph.

As an internal standard, argon is added to the methane feedstream in a 20 percent argon/80 percent methane ratio. A flow rate of approximately 10 cubic centimeters per minute was utilized. Product ratio of $H_2$ to CO varied from 1.7 to 2.0, with carbon balance varying by only 5 percent over a period of 1,000 hours.

While the invention has been described with reference to details of the illustrated embodiment, these details are not intended to limit the scope of the invention as defined in the appended claims. For example, while silver has been utilized as the metal additive for the membrane, other metals having resilience to corrosion in reducing environs are suitable. Also, gases aside from methane are suitable candidates for oxidation, such gases including the lower number saturated and unsaturated carbon molecules containing from one to five carbons.

The embodiment of the invention in which an exclusive property or privilege is claimed is defined as follows:

1. A substrate through which oxygen is transported, consisting of:

a) a Sr—Fe—Co-oxide having the general chemical formula SrFeCo$_{0.5}$O$_x$ wherein x approximately equal to 3; and b) a metal combined with said oxide to form a homogenous mixture, with the metal present in an amount to maximize the oxygen-ion transport capabilities of the substrate, and the metal comprising between 2 and 4 weight percent of the substrate.

2. The substrate as recited in claim 1 wherein the metal is selected from the group consisting of silver, cobalt, gold, palladium, platinum, chromium, zirconium-nickel alloy, copper-nickel alloy, copper-zirconium alloy, copper-silver alloy, nickel-titanium alloy, aluminum-iron alloy, nickel-boron alloy, copper-titanium alloy, silver-chromium alloy, silver-palladium alloy, and alloy combinations thereof.

3. The substrate as recited in claim 1 wherein the metal melts at approximately less than 1,100° C.

4. The substrate as recited in claim 1 wherein the metal is silver present in a 2–4 weight percent relative to the oxide.

5. The substrate as recited in claim 1 wherein the metal is silver present in a 2–4 weight percent relative to the oxide.

6. The substrate as recited in claim 1 wherein the substrate has a flexural strength between 100 MPa and 172 MPa.

7. The substrate as recited in claim 1 wherein the substrate has a fracture toughness between approximately 2.22 MPa Vm to 2.97 MPa Vm.

8. The substrate as recited in claim 1 wherein the metal melts at 1100° C.

9. A membrane through which oxygen is transported, consisting of:

a) a Sr—Fe—Co-oxide having the general chemical formula SrFeCo$_{0.5}$O$_x$ wherein x approximately equal to 3; and b) a metal combined with said oxide to form a homogenous mixture, with the metal comprising between 2 and 4 weight percent of the substrate so that the oxygen-ion transport capabilities of the substrate are increased.

10. The membrane as recited in claim 9 wherein the metal is an element selected from the group consisting of Ag, Co, Cr, Pt, and Au.

11. The membrane as recited in claim 9 wherein the metal is an alloy selected from the group consisting of zirconium-nickel combinations, copper-nickel combinations, copper-zirconium combinations, copper-silver combinations, nickel-titanium combinations, aluminum-iron combinations, nickel-boron combinations, copper-titanium combinations, silver-chromium combinations, and silver-palladium combinations.

* * * * *

UNITED STATES PATENT AND TRADEMARK OFFICE
CERTIFICATE OF CORRECTION

PATENT NO. : 6,117,808
DATED : September 12, 2000
INVENTOR(S) : P. Subraya Maiya, et. al.

It is certified that error appears in the above-indentified patent and that said Letters Patent is hereby corrected as shown below:

Column 8, line 19, "...wherein x approximately..." should read "...wherein x is approximately..."

Column 8, line 49, "...wherein x approximately..." should read "...wherein x is approximately..."

Signed and Sealed this

Tenth Day of April, 2001

Attest:

NICHOLAS P. GODICI

*Attesting Officer*  *Acting Director of the United States Patent and Trademark Office*